(12) United States Patent
Walters et al.

(10) Patent No.: US 8,229,970 B2
(45) Date of Patent: Jul. 24, 2012

(54) EFFICIENT STORAGE AND RETRIEVAL OF POSTING LISTS

(75) Inventors: Chad Walters, San Francisco, CA (US); Giovanni Lorenzo Thione, San Francisco, CA (US); Barney Pell, San Francisco, CA (US); Lukas Biewald, San Francisco, CA (US); Brendan O'Connor, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 469 days.

(21) Appl. No.: 12/201,079

(22) Filed: Aug. 29, 2008

(65) Prior Publication Data

US 2009/0132521 A1    May 21, 2009

Related U.S. Application Data

(60) Provisional application No. 60/969,495, filed on Aug. 31, 2007, provisional application No. 60/969,486, filed on Aug. 31, 2007.

(51) Int. Cl.
*G06F 17/30* (2006.01)

(52) U.S. Cl. ...................................................... 707/802

(58) Field of Classification Search .................. 707/100, 707/999.003, 737, 805
See application file for complete search history.

(56) References Cited

U.S. PATENT DOCUMENTS

| | | | |
|---|---|---|---|
| 4,876,643 A | 10/1989 | McNeil et al. | |
| 5,519,608 A | 5/1996 | Kupiec | |
| 5,530,939 A | 6/1996 | Mansfield, Jr. et al. | |
| 5,696,962 A | 12/1997 | Kupiec | |
| 5,933,822 A | 8/1999 | Braden-Harder et al. | |
| 6,076,051 A | 6/2000 | Messerly | |
| 6,161,084 A | 12/2000 | Messerly | |
| 6,185,592 B1 | 2/2001 | Boguraev et al. | |
| 6,189,002 B1 | 2/2001 | Roitblat | |
| 6,243,670 B1 | 6/2001 | Bessho et al. | |
| 6,246,977 B1 | 6/2001 | Messerly et al. | |
| 6,269,368 B1 | 7/2001 | Diamond | |

(Continued)

FOREIGN PATENT DOCUMENTS

EP        0597630        5/1994

(Continued)

OTHER PUBLICATIONS

International Search Report dated Mar. 26, 2009 in International Application No. PCT/US2008/074935.

(Continued)

*Primary Examiner* — Sheree Brown
(74) *Attorney, Agent, or Firm* — Hope Baldauff Hartman, LLC (57) ABSTRACT

A role tree having nodes corresponding to semantic roles in a hierarchy is defined. A posting list is generated for each association of a term and a semantic role in the hierarchy. The posting lists are stored contiguously on a physical storage medium such that a subtree of the hierarchy of semantic roles can be loaded from the storage medium as a single contiguous block. The posting lists for a subtree of the hierarchy are retrieved by obtaining data identifying the beginning location on the physical storage medium of the posting lists for the term at the top of a desired subtree of the hierarchy and data identifying the length of the posting lists of the desired subtree of the hierarchy. A single contiguous block that includes the posting lists for the desired subtree of the hierarchy is then retrieved from the beginning location through the specified length.

4 Claims, 8 Drawing Sheets

U.S. PATENT DOCUMENTS

| | | | |
|---|---|---|---|
| 6,366,908 B1 | 4/2002 | Chong et al. | |
| 6,374,209 B1 | 4/2002 | Yoshimi et al. | |
| 6,654,740 B2 | 11/2003 | Tokuda et al. | |
| 6,675,159 B1 | 1/2004 | Klein et al. | |
| 6,678,677 B2 | 1/2004 | Roux et al. | |
| 6,741,981 B2 | 5/2004 | McGreevy | |
| 6,766,316 B2 | 7/2004 | Claudill et al. | |
| 6,766,320 B1 | 7/2004 | Wang et al. | |
| 6,795,820 B2 | 9/2004 | Barnett | |
| 6,823,301 B1 | 11/2004 | Ishikura | |
| 6,842,730 B1 | 1/2005 | Ejerhed et al. | |
| 6,871,199 B1 | 3/2005 | Binning et al. | |
| 6,901,399 B1 | 5/2005 | Corston | |
| 6,947,923 B2 | 9/2005 | Cha et al. | |
| 6,968,332 B1 | 11/2005 | Milic-Frayling | |
| 7,016,828 B1 | 3/2006 | Coyne et al. | |
| 7,027,974 B1 | 4/2006 | Busch et al. | |
| 7,031,910 B2 | 4/2006 | Eisele | |
| 7,035,876 B2 | 4/2006 | Abrego et al. | |
| 7,120,574 B2 | 10/2006 | Troyanova et al. | |
| 7,171,349 B1 | 1/2007 | Wakefield et al. | |
| 7,184,950 B2 | 2/2007 | Weise | |
| 7,194,406 B2 | 3/2007 | Ejerhed et al. | |
| 7,225,121 B2 | 5/2007 | Maxwell et al. | |
| 7,269,594 B2 | 9/2007 | Corston-Oliver | |
| 7,319,951 B2 | 1/2008 | Rising et al. | |
| 7,346,490 B2 | 3/2008 | Fass | |
| 7,389,224 B1 | 6/2008 | Elworthy | |
| 7,398,201 B2 | 7/2008 | Marchisio | |
| 7,401,077 B2 | 7/2008 | Bobrow et al. | |
| 7,403,938 B2 | 7/2008 | Harrison et al. | |
| 7,424,467 B2* | 9/2008 | Fontoura et al. | 1/1 |
| 7,461,064 B2* | 12/2008 | Fontoura et al. | 1/1 |
| 7,502,810 B2* | 3/2009 | Acevedo-Aviles et al. | 1/1 |
| 7,634,466 B2* | 12/2009 | Rose et al. | 1/1 |
| 7,698,259 B2* | 4/2010 | Xue | 707/999.003 |
| 7,743,060 B2* | 6/2010 | Fontoura et al. | 707/737 |
| 7,774,383 B2* | 8/2010 | Acevedo-Aviles et al. | 707/805 |
| 2002/0091684 A1 | 7/2002 | Nomiyama et al. | |
| 2003/0233224 A1 | 12/2003 | Marchisio et al. | |
| 2004/0103090 A1 | 5/2004 | Dogl et al. | |
| 2004/0103105 A1* | 5/2004 | Lindblad et al. | 707/100 |
| 2004/0243554 A1 | 12/2004 | Broder et al. | |
| 2004/0243556 A1 | 12/2004 | Ferrucci et al. | |
| 2004/0249795 A1 | 12/2004 | Brockway | |
| 2005/0043936 A1 | 2/2005 | Corston-Oliver et al. | |
| 2005/0065777 A1 | 3/2005 | Dolan et al. | |
| 2005/0071150 A1 | 3/2005 | Nasypny | |
| 2005/0108001 A1 | 5/2005 | Aarskog | |
| 2005/0108630 A1 | 5/2005 | Wasson et al. | |
| 2005/0182619 A1 | 8/2005 | Azara | |
| 2005/0267871 A1 | 12/2005 | Marchisio et al. | |
| 2006/0020607 A1* | 1/2006 | Patterson | 707/100 |
| 2006/0047632 A1 | 3/2006 | Zhang | |
| 2006/0156222 A1 | 7/2006 | Chi | |
| 2006/0161534 A1 | 7/2006 | Carson, Jr. et al. | |
| 2006/0184517 A1 | 8/2006 | Anderson | |
| 2006/0224582 A1 | 10/2006 | Hogue | |
| 2006/0271353 A1 | 11/2006 | Berkan et al. | |
| 2006/0294086 A1* | 12/2006 | Rose et al. | 707/3 |
| 2007/0073533 A1 | 3/2007 | Thione et al. | |
| 2007/0073745 A1 | 3/2007 | Scott | |
| 2007/0143098 A1 | 6/2007 | Van der Berg | |
| 2007/0156393 A1 | 7/2007 | Todhunter et al. | |
| 2008/0033982 A1 | 2/2008 | Parikh | |
| 2008/0086498 A1 | 4/2008 | Sureka | |
| 2008/0120279 A1 | 5/2008 | Xue | |
| 2008/0172628 A1 | 7/2008 | Mehrotra | |
| 2009/0271179 A1 | 10/2009 | Marchisio et al. | |
| 2010/0106706 A1 | 4/2010 | Rorex | |

FOREIGN PATENT DOCUMENTS

| | | |
|---|---|---|
| KR | 10-0546743 | 4/2005 |
| WO | WO 02/067145 | 8/2002 |

OTHER PUBLICATIONS

Bontcheva et al., "Shallow Methods for Named Entity Coreference Resolution," Proceedings of the TALN 2002 Workshop. Nancy, France. Jun. 24-27, 2002, 9 pages.

Ng, Vincent "Shallow Semantics for Coreference Resolution," Proceedings of the Twentieth International Joint Conference on Artificial Intelligence (IJCAI), Hyderabad, India, Jan. 2007, pp. 1689-1694.

Duchier, Denys,"Constraint Programming for Natural Language Processing", retrieved at <<http://citeseerx.ist.psu.edu/viewdoc/download;jsessionid=F70461C9F31A4EB405543CE688CCBF3D?doi=10.1.1.10.3152&rep=rep1&type=pdf>>, 2000. pp. 1-94.

"Powerset, Natural Language Search Engine", retrieved at <<http://googlesystem.blogspot.com/2007/02/powerset-natural-language-search-engine.html>>, Feb. 9, 2007. pp. 1-3.

Chien, Lee-Feng,"Fast and Quasi-Natural Language Search for Gigabytes of Chinese Texts", retrieved at <<http://delivery.acm.org/10.1145/220000/215345/p112-chien.pdf?key1=215345&key2=4667021221&coll=GUIDE&dl=GUIDE&CFID=2506110&CFTOKEN=93982745>>, 1995. pp. 1-9.

Kolodner Janet L.,"Indexing and Retrieval Strategies for Natural Language Fact Retrieval", retrieved z, retrieved at <<http://delivery.acm.org/10.1145/320000/319995/p434-kolodner.pdf?key1=319995& key2=1457021221&coll=GUIDE&dl=GUIDE& CFID=2551390&CFTOKEN=71366194>>, ACM Transactions on Database Systems, vol. 8, No. 3, Sep. 1983. pp. 1-31.

Thione, et al., "Applying Term Occurrence constraints in natural language search", U.S. Appl. No. 60/969,406, filed Aug. 31, 2007.

Walters, et al., "Flexible Ranking infrastructure for query execution", U.S. Appl. No. 60/969,410, filed Aug. 31, 2007.

Walters, et al., "Checkpointing of composable lazily-evaluated integrators in search", U.S. Appl. No. 60/969,417, filed Aug. 31, 2007.

Thione, et al., "Indexing of alias clusters for search", U.S. Appl. No. 60/969,426, filed Aug. 31, 2007.

Crouch, et al., "Aboutness identification and indexing", U.S. Appl. No. 60/969,434, filed Aug. 31, 2007.

Polanyi, et al., "Valence calculus for indexing with special reference to reported speech and thought", U.S. Appl. No. 60/969,442, filed Aug. 31, 2007.

Snow, et al., "Bucketized threshold for runtime pruning of senses/ranking", U.S. Appl. No. 60/969,447, filed Aug. 31, 2007.

Pell, et al., "Hierarchal probability-based weighting for hypernyms in word sense disambiguation", U.S. Appl. No. 60/969,451, filed Aug. 31, 2007.

Biewald, et al., "Priority-based ranking functions for information retrieval", U.S. Appl. No. 60/969,453, filed Aug. 31, 2007.

Pell, et al.,"Priority-based disjunctive retrieval", U.S. Appl. No. 60/969,457, filed Aug. 31, 2007.

Rayner, et al., "Semi-automatic example-based induction of semantic translation rules to support natural language search", U.S. Appl. No. 60/969,472, filed Aug. 31, 2007.

Thione, et al., "Semantically-based highlighting of search results", U.S. Appl. No. 60/969,478, filed Aug. 31, 2007.

Salvetti, et al., "Integration of conference resolution in an ambiguity-sensitive natural language processing pipeline for a search platform", U.S. Appl. No. 60/969,483, filed Aug. 31, 2007.

Thione, et al.,"Fact-based indexing for natural language search", U.S. Appl. No. 60/969,486, filed Aug. 31, 2007.

Thione, et al., "Attribute-value mapping to map structural about entities on ontologies", U.S. Appl. No. 60/969,488, filed Aug. 31, 2007.

Thione, et al., "Indexing and ranking role hierarchies search index", U.S. Appl. No. 60/969,490, filed Aug. 31, 2007.

Thione, et al., "Efficient posting layout for retrieval of terms in dominance hierarchies", U.S. Appl. No. 60/969,495, filed Aug. 31, 2007.

Salvetti, et al., "A system for browsing knowledge on the basis of semantic relations", U.S. Appl. No. 60/971,061, filed Sep. 10, 2007.

International Search Report dated Apr. 29, 2009 in International Application No. PCT. No. PCT/US08/074981.

U.S. Official Action dated Jan. 3, 2011 in U.S. Appl. No. 12/201,596.

Jun et al., "Keyfact-Based Information Retrieval System", TaeJon, Korea, downloaded Mar. 18, 2011 from http://www.dl.slis.tsukuba.ac.jp/ISDL97/proceedings/miseon/miseon.html, 6 pages.

Tablan et al., "A Natural Language Query Interface to Structured Information", downloaded Mar. 18, 2011 from http://www.eswc2008.org/final-pdfs-for-web-site/onl-2.pdf, 15 pages.

U.S. Official Action dated Jun. 22, 2011 in U.S. Appl. No. 12/201,596.

International Search Report dated Mar. 31, 2009 in International Application No. PCT/US08/074938.

International Search Report dated Jan. 23, 2009 in International Application No. PCT/US08/074978.

International Search Report dated Mar. 31, 2009 in International Application No. PCT/US08/074984.

International Search Report dated Mar. 31, 2009 in International Application No. PCT/US08/074987.

European Search Report dated Oct. 5, 2011 in European Application No. 08799054.5.

U.S. Official Action dated Mar. 17, 2011 in U.S. Appl. No. 12/201,504.

U.S. Official Action dated Oct. 12, 2011 in U.S. Appl. No. 12/201,504.

U.S. Official Action dated Jan. 25, 2011 in U.S. Appl. No. 12/201,675.

U.S. Official Action dated Apr. 14, 2011 in U.S. Appl. No. 12/201,675.

U.S. Official Action dated Oct. 3, 2011 in U.S. Appl. No. 12/201,675.

U.S. Official Action dated Mar. 15, 2011 in U.S. Appl. No. 12/201,721.

U.S. Official Action dated Oct. 26, 2011 in U.S. Appl. No. 12/201,721.

U.S. Official Action dated Dec. 23, 2010 in U.S. Appl. No. 12/201,978.

U.S. Official Action dated Jun. 7, 2011 in U.S. Appl. No. 12/201,978.

Agichtein, et al., "Snowball: Extracting Relations from Large Plain-Text Collections," Dec. 1999, Columbia University Computer Science Dept. Technical Report CUCS-033-99, 13 pp.

Alesso, "Semantic Search Methods," downloaded Aug. 28, 2008 from hltp://microsoft.apress.com/asptodayarchive173985/semantic-search-methods, 14 pages.

Araghi, "Users Satisfaction through Belter Indexing," 2005, *Cataloging & Classification Quarterly*, 40(2): 5-12. 9 pp.

CS474 Intro to Natural Language Processing: Question Answering, downloaded Dec. 12, 2011 from http://www.cs.cornell.edu/courses/cs474/2005fa/Handouts/advanced-qa.pdf, 8 pgs.

Debrauwer et al., "Semantic Searching and Text Analysis with Distinguo®," downloaded Dec. 12, 2011 from http://www.ultralingua.com/ul/en/dox/Distinguo-White-Paper.pdf, 6 pp.

Hakia—Meaning-based Search Engine for a Better Search, downloaded Aug. 28, 2008 from http://www.techiequest.com/hakia-meaning-based-search-engine-for-a-bettr-search/, 8 pgs.

Han et al, "A Study on the Conceptual Modeling and Implementation of a Semantic Search System," Mar. 2008, *Korea Intelligent Information Systems Society*, 14(1): 67-84.

Huibers, "Towards an Axiomatic Aboutness Theory for Information Retrieval," 1998, Information Retrieval: Uncertainty and Logics—Advanced Models for the Representation and Retrieval of Information. Kluwer Academic Publishers, 7 pp.

Hussam et al., "Semantic Highlighting on the WWW: Educational Implications," Nov. 1998, *Proceedings of the WebNet 98 World Conference on the WWW, Internet and Intranet*, 6 pp.

Hutchins, "On the problem of 'Aboutness' in Document Analysis," Apr. 1977, *Journal of Informatics*, 1(1): 17-35. 16 pp.

Kang, et al., "Document Indexing: A Concept-Based Approach to Term Weight Estimation," 2005, *Information Processing and Management*, 41:1065-1080, 16 pp.

Kapoor et al., "STAR: A System for Tuple and Attribute Ranking of Query Answer" Apr. 15, 2007, *International Conference on Data Engineering 2007*, 2 pp.

Lo et al., "Using Semantic Relations with World Knowledge for Question Answering," 2006, *Proceedings of the 15th Text Retrieval Conference (TREC 15)*, 6 pp.

Manegold et al., A multi-query optimizer for Monet, Jan. 31, 2000, Information Systems, 18 pgs.

Moens et al., "Measuring Aboutness of an Entity in a Text," 2006, *Proceedings of the 1st Workshop on Graph Based Methods for Natural Language Processing*, 4 pp.

Seki, Y., "Answer Extraction System by Question Type from Query Biased Summary for Newspaper Articles," Sep. 2001-Oct. 2002, *Proceedings of the 3rd NTCIR Workshop*, 8 pp.

Sieg et al., "Learning Ontology-based User Profiles: A Semantic Approach to Personalized Web Search," Nov. 2007, *IEEE Intelligent Informatics Bulletin*, 8(1): 7-18. 12pp.

Smeaton et al., "Experiments on Using Semantic Distances between Words in Images Caption Retrieval," Aug. 1996, *Proceedings of the 19th Annual International ACM SIGIR Conference on Research and Development in Information Retrieval*, 8 pp.

Srihari et al., "Information Extraction Supported Question Answering," Oct. 15, 1999, downloaded from http://handle.dtic.mil/100.2/ADA460042, 12 pgs.

Taibi, et al., "A Semantic Search Engine for Learning Resources," 2005, *Recent Research Developments in Learning Technologies*, http://www.formatex.org/micte2005/349.pdf, 5 pp.

Vintar et al., "Semantic Relations in Concept-Based Cross-Language Medical Information Retrieval," Sep. 22, 2003, *Proceedings of the ECML / PKDD Workshop on Adaptive Text Extraction and Mining*, 9 pp.

U.S. Notice of Allowance dated Apr. 5, 2012 in U.S. Appl. No. 12/201,504.

U.S. Notice of Allowance dated May 14, 2012 in U.S. Appl. No. 12/201,721.

U.S. Official Action dated Jan. 4, 2012 in U.S. Appl. No. 12/201,978.

* cited by examiner

EFFICIENT STORAGE AND RETRIEVAL OF POSTING LISTS

CROSS-REFERENCE TO RELATED APPLICATIONS

This application claims the benefit of U.S. provisional patent application No. 60/969,495, which was filed on Aug. 31, 2007, and entitled "Efficient Posting Layout for Retrieval of Terms in Dominance Hierarchies" and U.S. provisional patent application 60/969,486, which was filed on Aug. 31, 2007, and entitled "Fact-Based Indexing for Natural Language Search", both of which are expressly incorporated herein by reference in their entirety.

BACKGROUND

Many types of search engine indexing algorithms utilize inverted indexes. An inverted index is a data structure that is utilized to store a mapping between terms and the location of the terms within a database, document, or set of documents. For instance, an inverted index may be utilized to store a mapping between words and World Wide Web ("Web") pages in which the words are utilized. Data identifying the particular location at which each term appears within a document might also be stored in an inverted index. The list of documents in which a particular term appears is commonly referred to as a posting list.

Some types of indexing algorithms generate a separate entry in the inverted index for each semantic role that a term occurs in. This results in a separate posting list and a separate entry in the index to the posting lists, called the lexicon, for each term-role pair. For instance, one posting list may be created in the index for the word "dog" and the role "subject." Another posting list may be created for the word "cake" and the role "object." In order to identify documents where a dog is the subject and a cake is the object, such as for example where a dog is described as eating a cake, an intersection operation is performed between the two posting lists. Semantically based search engines may utilize this type of indexing and document retrieval.

Because inverted indices can grow very large in size, they are often stored on disk. Portions of the inverted index may be read from disk into main memory for quicker access. Regardless of the type of physical storage medium an inverted index is stored upon, it is often the case that no particular assumption is made about the layout of posting lists on the physical storage medium relative to one another. However, an arbitrary layout of posting lists on a physical storage medium can lead to poor performance, especially in systems using an inverted index where runtime operations are performed to the intersection of posting lists for multiple terms that are related to each other in a strict dominance relation, such as semantically based search engines.

It is with respect to these considerations and others that the disclosure made herein is presented.

SUMMARY

Technologies are described herein for efficient storage and retrieval of posting lists. Through the use of the concepts and technologies presented herein, posting lists are stored in a manner that allows posting lists for related semantic roles of a term to be retrieved from a physical storage medium, such as a mass storage device or random access memory, as a single contiguous block.

According to one aspect presented herein, a hierarchy of semantic roles is defined. For instance, a role tree having nodes corresponding to the semantic roles may be defined. In one embodiment, the nodes of the role tree are related to one another in a strict dominance relation. This means that there is a single term that is at the top of the hierarchy and that the other terms are directly dominated by exactly one other node and are dominated by the root, either directly or indirectly. The semantic roles defined by the hierarchy are associated with a term. For instance, if the word "dog" is utilized in the semantic role of subject, then a semantic role within the hierarchy for subject will be associated with the word "dog" (e.g. "dog.subject").

A posting list is also generated for each association of a term and a semantic role in the hierarchy. The posting list includes data that identifies one or more documents that include the usage of the term in the associated semantic role. For instance, using the example above, the posting list for the term "dog.subject" would include data identifying those documents wherein the word "dog" is used in the semantic role of subject. The posting lists may also include additional data such as data identifying the locations in the document at which the word is utilized.

Once the posting lists have been generated, they are stored contiguously on a physical storage medium such that a subtree of the hierarchy of semantic roles can be loaded from the storage medium as a single, contiguous block. For instance, in one embodiment, the posting lists are stored by performing a pre-order, depth-first traversal of the nodes of the role tree. At each of the nodes, the posting list is written to the physical storage medium for the term associated with the semantic role corresponding to the node. As an example, the posting list for the term "dog.subject" would be written to disk when the node in the hierarchy corresponding to the semantic role subject is encountered during the pre-order, depth-first traversal of the role tree. In this manner, the posting lists for the various semantic uses of a term are written to the physical storage medium in a contiguous manner.

In order to assist with the retrieval of the posting lists from the physical storage medium, data may also be written during the traversal of the role tree that identifies the starting position of the posting list for each node in the role tree and that indicates the total size for the posting lists under each node. This data may be stored in an index to the posting lists, also referred to herein as a "lexicon", or in another location.

In order to retrieve the posting lists for a subtree of the hierarchy, the data identifying the beginning location on the physical storage medium of the posting lists for the term at the top of a desired subtree of the hierarchy is retrieved. The data identifying the length of the posting lists in the desired subtree of the hierarchy is also retrieved. A single contiguous block that includes the posting lists for the desired subtree of the hierarchy is then retrieved from the beginning location through the specified length.

According to one embodiment, a natural language engine utilizes the posting lists in a semantic index. It should be appreciated, however, that other types of search engines might also utilize the concepts and technologies presented herein for efficiently storing posting lists. It should also be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to technologies for efficiently storing and retrieving posting lists. While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific embodiments or examples. Referring now to the drawings, in which like numerals represent like elements through the several figures, aspects of a computing system and methodology for efficiently representing word sense probabilities will be described.

Figure 1:
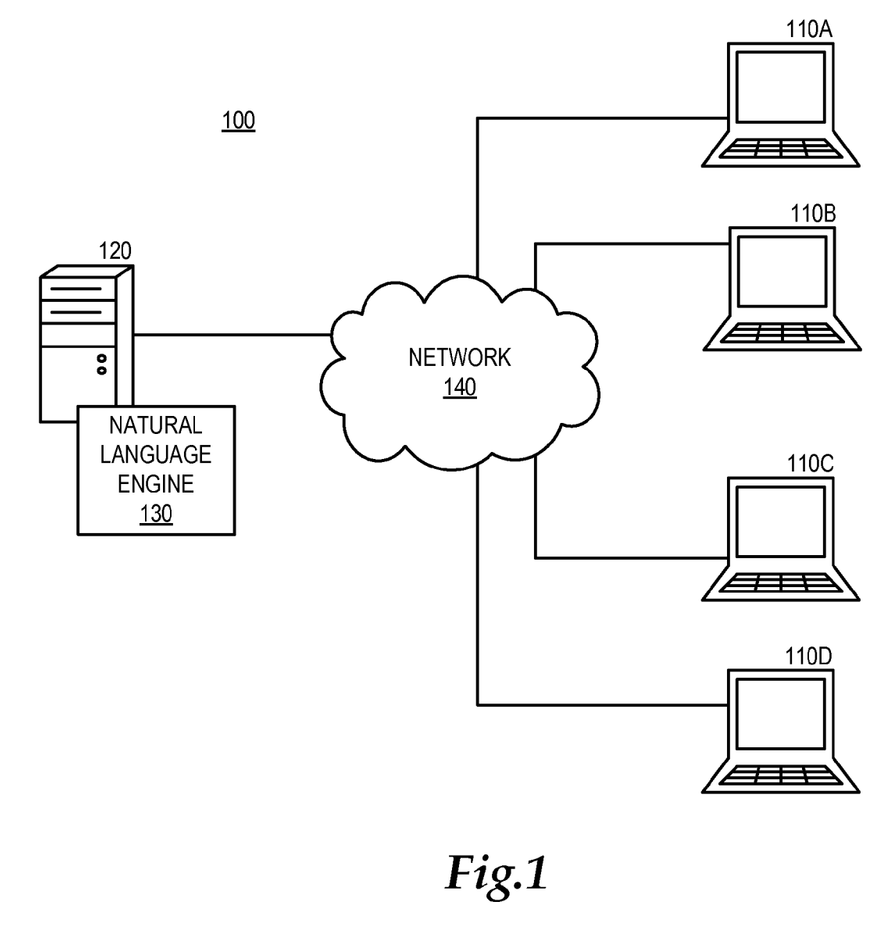
FIG. 1 is a network diagram showing aspects of an illustrative operating environment for the embodiments presented herein.

Turning now to FIG. 1, details will be provided regarding an illustrative operating environment for the implementations presented herein. In particular, a network architecture diagram 100 illustrates an information search system according to aspects of an embodiment presented herein. Client computers 110A-110D can interface through a network 140 to a server 120 to obtain information associated with a natural language engine 130. While four client computers 110A-110D are illustrated, it should be appreciated that any number of client computers 110A-110D may be in use. The client computers 110A-110D may be geographically distributed across a network 140, collocated, or any combination thereof. While a single server 120 is illustrated, it should be appreciated that the functionality of the server 120 may be distributed over any number of multiple servers 120. Such multiple servers 120 may be collocated, geographically distributed across a network 140, or any combination thereof.

According to one or more embodiments, the natural language engine 130 may support search engine functionality. In a search engine scenario, a user query may be issued from a client computer 110A-110D through the network 140 and on to the server 120. The user query may be in a natural language format. At the server, the natural language engine 130 may process the natural language query to support a search based upon syntax and semantics extracted from the natural language query. Results of such a search may be provided from the server 120 through the network 140 back to the client computers 110A-110D.

One or more search indexes may be stored at, or in association with, the server 120. Information in a search index may be populated from a set of source information, or a corpus. For example, in a web search implementation, content may be collected and indexed from various web sites on various web servers (not illustrated) across the network 140. Such collection and indexing may be performed by software executing on the server 120, or on another computer (not illustrated). The collection may be performed by web crawlers or spider applications. The natural language engine 130 may be applied to the collected information such that natural language content collected from the corpus may be indexed based on syntax and semantics extracted by the natural language engine 130. Indexing and searching is discussed in further detail with respect to FIG. 2.

The client computers 110A-110D may act as terminal clients, hypertext browser clients, graphical display clients, or other networked clients to the server 120. For example, a web browser application at the client computers 110A-110D may support interfacing with a web server application at the server 120. Such a browser may use controls, plug-ins, or applets to support interfacing to the server 120. The client computers 110A-110D can also use other customized programs, applications, or modules to interface with the server 120. The client computers 110A-110D can be desktop computers, laptops, handhelds, mobile terminals, mobile telephones, television set-top boxes, kiosks, servers, terminals, thin-clients, or any other computerized devices.

The network 140 may be any communications network capable of supporting communications between the client computers 110A-110D and the server 120. The network 140 may be wired, wireless, optical, radio, packet switched, circuit switched, or any combination thereof. The network 140 may use any topology, and links of the network 140 may support any networking technology, protocol, or bandwidth such as Ethernet, DSL, cable modem, ATM, SONET, MPLS, PSTN, POTS modem, PONS, HFC, satellite, ISDN, WiFi, WiMax, mobile cellular, any combination thereof, or any other data interconnection or networking mechanism. The network 140 may be an intranet, an internet, the Internet, the World Wide Web, a LAN, a WAN, a MAN, or any other network for interconnection computers systems.

It should be appreciated that, in addition to the illustrated network environment, the natural language engine 130 can be operated locally. For example, a server 120 and a client computer 110A-110D may be combined onto a single computing device. Such a combined system can support search indexes stored locally or remotely.

Figure 2:
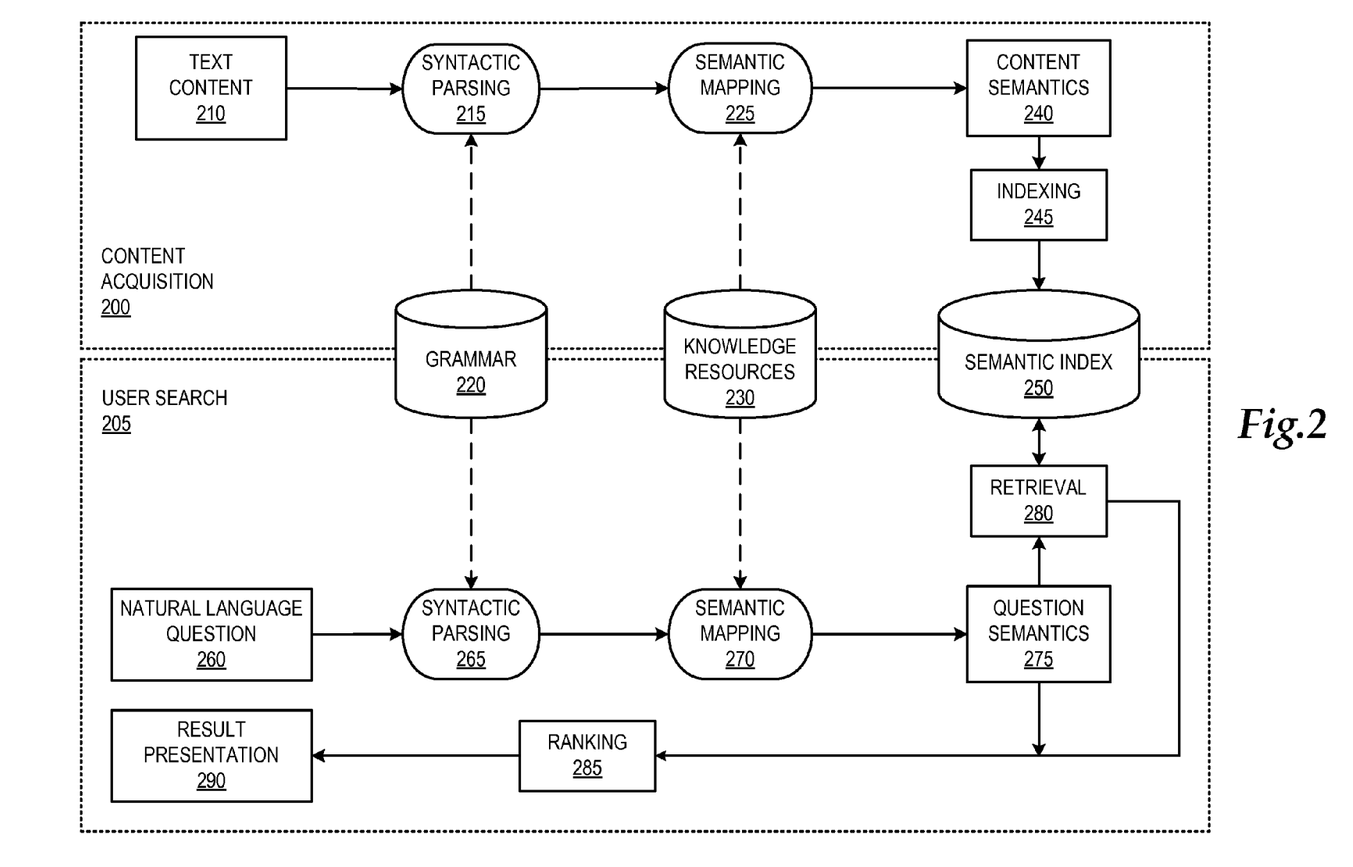
FIG. 2 is a software architecture diagram showing additional aspects of one illustrative operating environment for the embodiments presented herein.

Referring now to FIG. 2, a functional block diagram illustrates various components of a natural language engine 130 according to one exemplary embodiment. As discussed above, the natural language engine 130 can support information searches. In order to support such searches, a content acquisition process 200 is performed. Operations related to content acquisition 200 extract information from documents provided as text content 210. This information can be stored in a semantic index 250 that can be used for searching. Operations related to a user search 205 can support processing of a user entered search query. The user query can take the form of a natural language question 260. The natural language engine 130 can analyze the user input to translate a query into a representation to be compared with information represented within the semantic index 250. The content and structuring of information in the semantic index 250 can support rapid matching and retrieval of documents, or portions of documents, that are relevant to the meaning of the query or natural language question 260.

The text content 210 may comprise documents in a very general sense. Examples of such documents can include web pages, textual documents, scanned documents, databases, information listings, other Internet content, or any other information source. This text content 210 can provide a corpus of information to be searched. Processing the text content 210 can occur in two stages as syntactic parsing 215 and semantic mapping 225. Preliminary language processing steps may occur before, or at the beginning of parsing 215. For example, the text content 210 may be separated at sentence boundaries. Proper nouns may be identified as the names of particular people, places, objects or events. Also, the grammatical properties of meaningful word endings may be determined. For example, in English, a noun ending in "s" is likely to be a plural noun, while a verb ending in "s" may be a third person singular verb.

Parsing 215 may be performed by a syntactic analysis system such as the Xerox Linguistic Environment (XLE). Parsing 215 can convert sentences to representations that make explicit the syntactic relations among words. Parsing 215 can apply a grammar 220 associated with the specific language in use. For example, parsing 215 can apply a grammar 220 for English. The grammar 220 may be formalized, for example, as a lexical functional grammar (LFG). The grammar 220 can specify possible ways for constructing meaningful sentences in a given language. Parsing 215 may apply the rules of the grammar 220 to the strings of the text content 210.

A grammar 220 may be provided for various languages. For example, LFG grammars have been created for English, French, German, Chinese, and Japanese. Other grammars may be provided as well. A grammar 220 may be developed by manual acquisition where grammatical rules are defined by a linguist or dictionary writer. Alternatively, machine learning acquisition can involve the automated observation and analysis of many examples of text from a large corpus to automatically determine grammatical rules. A combination of manual definition and machine learning may be also be used in acquiring the rules of a grammar 220.

Parsing 215 can apply the grammar 220 to the text content 210 to determine constituent structures (c-structures) and functional structures (f-structures). The c-structure can represent a hierarchy of constituent phrases and words. The f-structure can encode roles and relationships between the various constituents of the c-structure. The f-structure can also represent information derived from the forms of the words. For example, the plurality of a noun or the tense of a verb may be specified in the f-structure.

During a semantic mapping process 225 that follows the parsing 215, information can be extracted from the f-structures and combined with information about the meanings of the words in the sentence. A semantic map or semantic representation of a sentence can be provided as content semantics 240. Semantic mapping 225 can augment the syntactic relationships provided by the parsing 215 with conceptual properties of individual words. The results can be transformed into representations of the meaning of sentences from the text content 210. Semantic mapping 225 can determine roles played by words in a sentence. For example, the subject performing an action, something used to carry out the action, or something being affected by the action. For the purposes of search indexing, words can be stored in a semantic index 250 along with their roles. Thus, retrieval from the semantic index 250 can depend not merely on a word in isolation, but also on the meaning of the word in the sentences in which it appears within the text content 210. Semantic mapping 225 can support disambiguation of terms, determination of antecedent relationships, and expansion of terms by synonym, hypernym, or hyponym.

Semantic mapping 225 can apply knowledge resources 230 as rules and techniques for extracting semantics from sentences. The knowledge resources can be acquired through both manual definition and machine learning, as discussed with respect to acquisition of grammars 220. The semantic mapping 225 process can provide content semantics 240 in a semantic extensible markup language (semantic XML or semxml) representation. Content semantics 240 can specify roles played by words in the sentences of the text content 210. The content semantics 240 can be provided to an indexing process 245.

An index can support representing a large corpus of information so that the locations of words and phrases can be rapidly identified within the index. A traditional search engine may use keywords as search terms such that the index maps from keywords specified by a user to articles or documents where those keywords appear. The semantic index 250 can represent the semantic meanings of words in addition to the words themselves. Semantic relationships can be assigned to words during both content acquisition 200 and user search 205. Queries against the semantic index 250 can be based on not only words, but words in specific roles. The roles are those played by the word in the sentence or phrase as stored in the semantic index 250. The semantic index 250 can be considered an inverted index that is a rapidly searchable database whose entries are semantic words (i.e. word in a given role) with pointers to the documents, or web pages, on which those words occur. The semantic index 250 can support hybrid indexing. Such hybrid indexing can combine features and functions of both keyword indexing and semantic indexing.

User entry of queries can be supported in the form of natural language questions 260. The query can be analyzed through a natural language pipeline similar, or identical, to that used in content acquisition 200. That is, the natural language question 260 can be processed by syntactic parsing 265 to extract syntactic structure. Following syntactic parsing 265, the natural language question 260 can be processed for semantic mapping 270. The semantic mapping 270 can provide question semantics 275 to be used in a retrieval process 280 against the semantic index 250 as discussed above. The retrieval process 280 can support hybrid index queries where both keyword index retrieval and semantic index retrieval may be provided alone or in combination.

In response to a user query, results of the retrieval process 280 from the semantic index 250 along with the question semantics 275 can inform a ranking process 285. Ranking can leverage both keyword and semantic information. During ranking 285, the results obtained by the retrieval process 280 can be ordered by various metrics in an attempt to place the most desirable results closer to the top of the retrieved information to be provided to the user as a result presentation 290.

Figure 3:
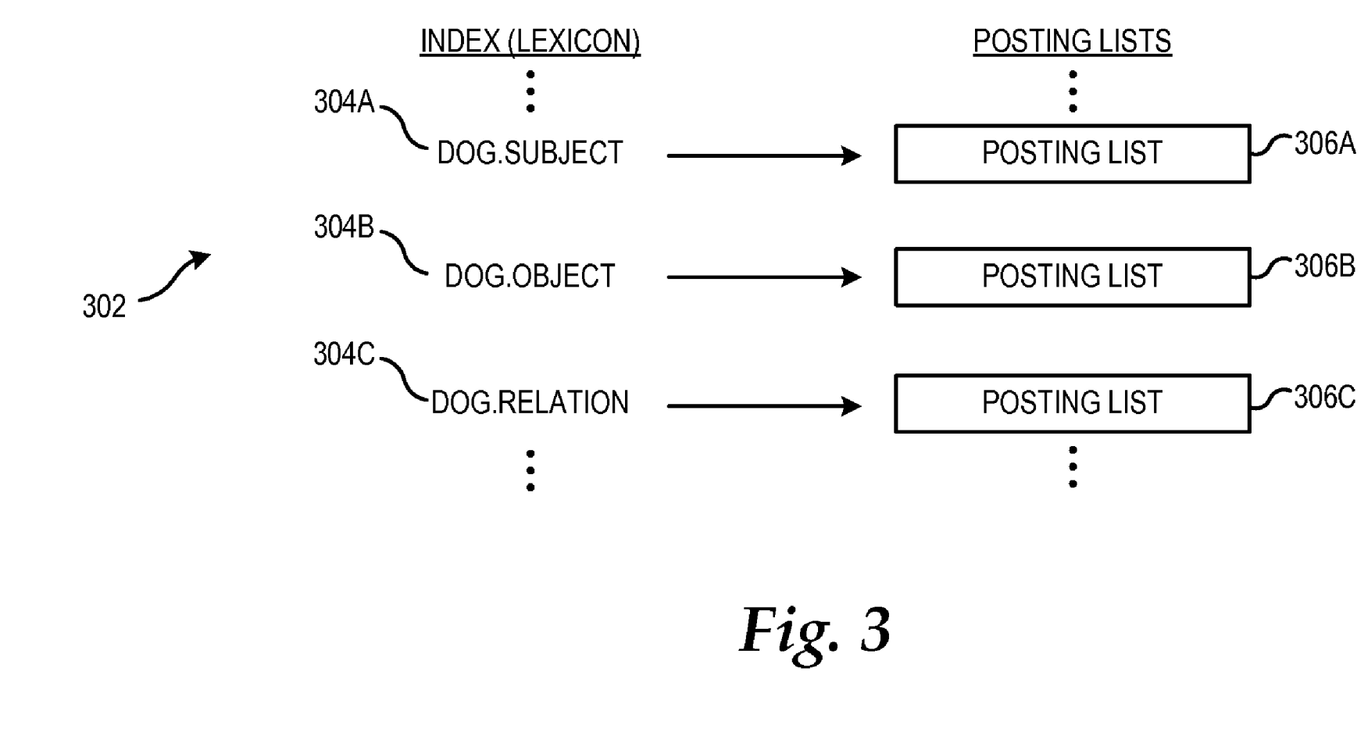
FIG. 3 is a data structure diagram illustrating aspects of an inverted index utilized in embodiments presented herein.

Turning now to FIG. 3, additional details will be provided regarding the embodiments presented herein for efficiently storing and retrieving posting lists. As discussed briefly above, the natural language engine 130 utilizes the posting lists in the semantic index 250 in one embodiment. It should be appreciated, however, that other types of search engines might also utilize the concepts and technologies presented herein for efficiently storing posting lists.

As will be described in greater detail below, one embodiment presented herein operates in the context of an indexing scheme wherein a separate term 304 is generated for a word in each of the roles that word occurs in. This results in a separate posting list 306 and a separate entry in a lexicon 302, also referred to herein as the index of posting lists, for each word-role pair. In this regard, words identified within the content 210 are decorated with their semantic role. A semantic role represents the particular role that a word played in the context in which it was found and/or analyzed. This decoration splits the lexicon 302 into multiple entries for each 'word', thus decorated with semantic roles. For example, the word "dog" might occur in the role of "subject", "object", or "relation" in various contexts. Therefore, in this example, the lexicon 302 shown in FIG. 3 will contain terms 304A-304C such as "dog.subject", "dog.object", and "dog.relation", each pointing to a different posting list 306A-306C, respectively. If a subset of roles occurs in a strict dominance hierarchy, then all terms that combine a given word with roles in that hierarchy will, as a matter of course, qualify as a set of terms with the appropriate dominance hierarchy. Details regarding the hierarchy of semantic roles will be provided in greater detail below.

As discussed briefly above, a posting list 306 is generated for each association of a term and a semantic role in a hierarchy. The posting list 306 includes data that identifies one or more documents that include the usage of the term in the associated semantic role. For instance, using the example above, the posting list 306A for the term "dog.subject" 304A would include data identifying those documents wherein the word "dog" is used in the semantic role of subject. The posting lists may also include additional data such as data identifying the locations in the document at which the word is utilized. Data is stored in the lexicon indicating the initial starting position of each of the posting lists 306A-306C on a physical storage medium. It should be appreciated that, as used herein, the term document refers to any type of text content including, but not limited to, Web pages, text documents, office documents, database entries, and others.

Figure 4:
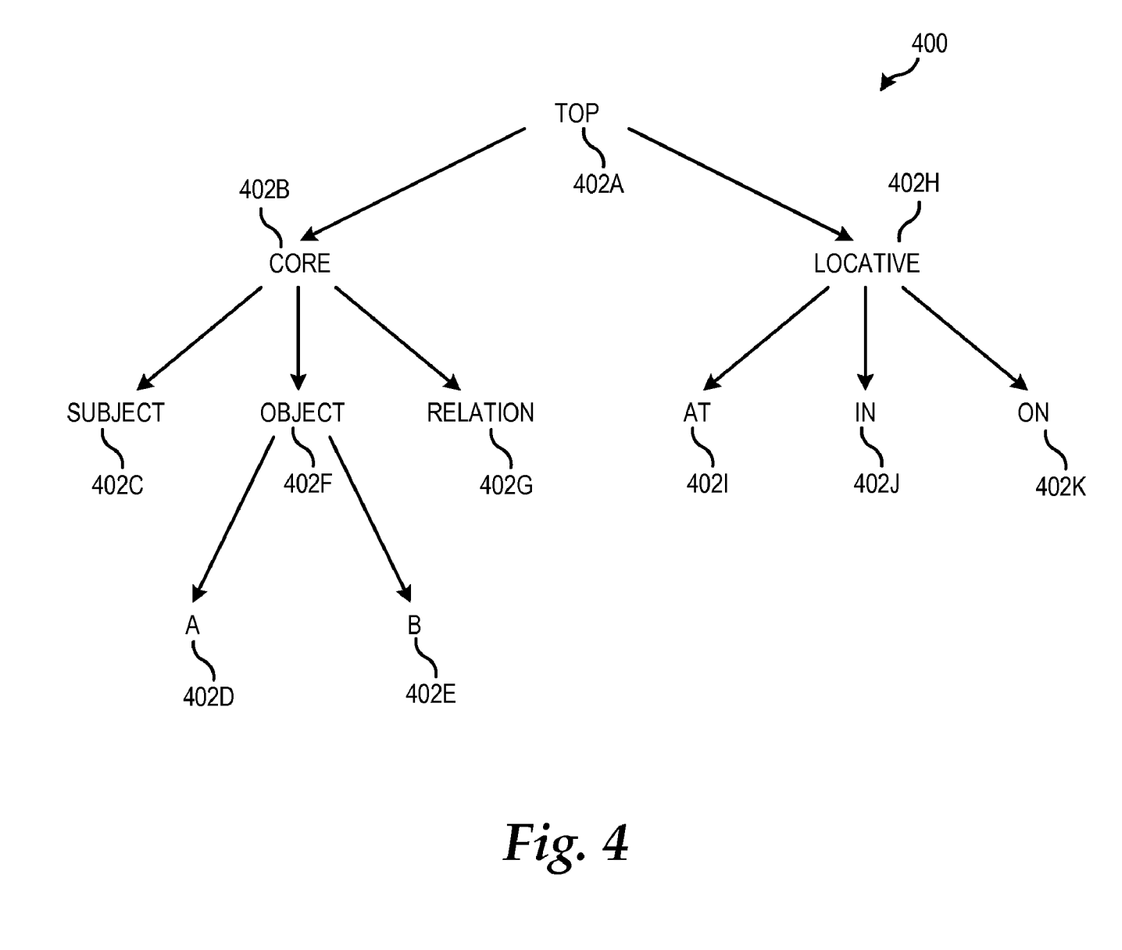
FIG. 4 is a tree diagram illustrating aspects of a role tree utilized in embodiments presented herein.

Turning now to FIG. 4, additional details regarding a hierarchy of semantic roles utilized herein will be provided. As described briefly above, the concepts and technologies presented herein utilize a restriction on the layout of the posting lists 306 in the case in which a strict dominance relation can be established amongst a subset of the terms 304. This dominance relation takes the form of a tree of terms 400 (referred to herein as the "role tree") such that there is a single term that is at the top of the dominance hierarchy (the "root") and that all other terms in the set are directly dominated by exactly one other node in the set and are dominated by the root (either directly or indirectly).

The example role tree 400 shown in FIG. 4 includes eleven nodes 402A-402K, each of which corresponds to a possible semantic role. For instance, the node 402H corresponds to a locative role, the node 402C corresponds to a subject role, and the note 402G corresponds to a relation role. The nodes of the role tree are, as discussed above, related to one another in a strict dominance relation. When a word is encountered in the content 210, the semantic role of the word in context is determined and the appropriate role in the role tree 400 is associated with the word. For instance, in the example shown in FIG. 2, a term "dog.subject" is created in response to identifying the use of the word "dog" in the subject role. A posting list 306A is also created identifying the documents in which the word "dog" is utilized in the subject role.

Figure 5:
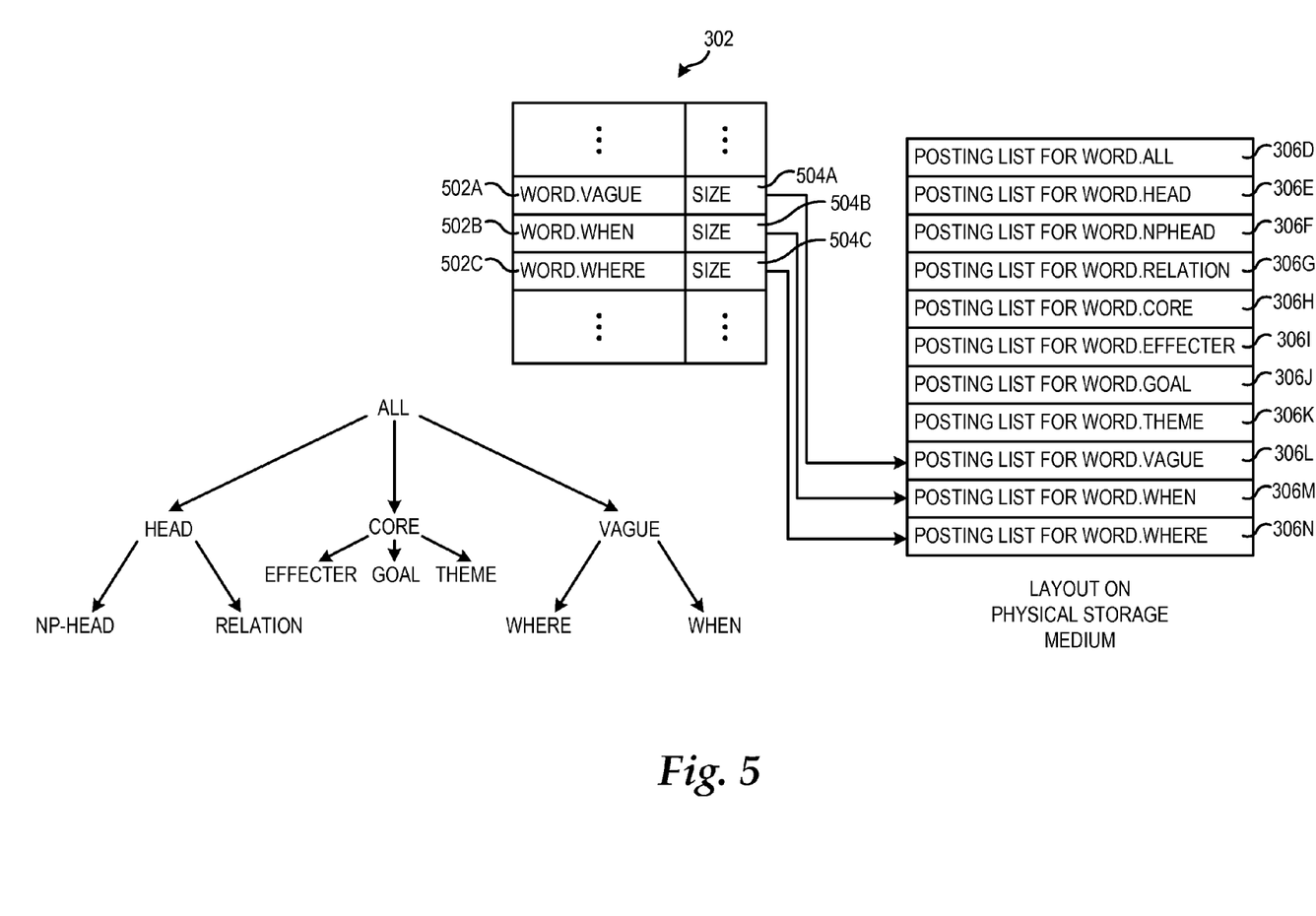
FIG. 5 is a tree diagram and data structure diagram showing an illustrative layout on a physical storage medium according to one embodiment presented herein for posting lists corresponding to several terms in an inverted index.

Referring now to FIG. 5, additional details will be provided regarding one process presented herein for efficiently storing the postings lists 306. In particular, utilizing the concepts and technologies presented herein, posting lists 306 from the hierarchy are laid out in a contiguous fashion such that any subtree in the hierarchy can be loaded from physical storage as a single contiguous block. In one embodiment, this is accomplished by writing out the posting lists 306 via a pre-order depth-first walk of the role tree 400. Data is also stored for each non-leaf node in the tree that indicates the total size of the posting lists 306 under that node. In one embodiment, this information is added to an entry 502 in the lexicon 302 for each term. For instance, the fields 504A-504C may be utilized to store the size of the posting lists for the entries 502A-202C in the lexicon 302. It should be appreciated, however, that this information might be stored in another location. As will be described in greater detail below with respect to FIG. 7, this information is utilized when retrieving the posting lists 306 from the physical storage medium.

FIG. 5 shows a sample role tree that includes the roles "all", "head", "np-head", "relation", "core", "effector", "goal", "theme", "vague", "where", and "when". Following a pre-order, depth-first traversal of the example role tree shown in FIG. 5, the posting lists 306D-306N for a word in each of its roles will be stored contiguously on a physical storage medium as shown in FIG. 5. It should be appreciated that with such a layout it is possible to efficiently retrieve any subtree of the hierarchy. In order to retrieve a subtree, the location of the posting list for the term at the top of the subtree is retrieved. The size 504 of the subtree associated with that term and the length of the desired posting list is also retrieved. The subtree is then retrieved beginning at the indicated location for the specified length. Additional details regarding one process presented herein for retrieving a subtree is provided below with respect to FIG. 7.

As will be described in greater detail below with respect to FIG. 7, in order to actually traverse the posting lists 306 for the individual terms within a block, additional information needs to be obtained from the lexicon 302 as to the starting positions for each of the terms within the hierarchy. One mechanism for accomplishing this is to store additional information at the start of each of the posting lists 306 to allow for enumeration of the postings. Another mechanism would be to make one or more additional lookups in the lexicon 302 for each of the sub-elements. This second method can be made more efficient by storing the lexicon entries themselves such that all the lexicon entries for terms in the dominance hierarchy are grouped together contiguously.

Figure 6:
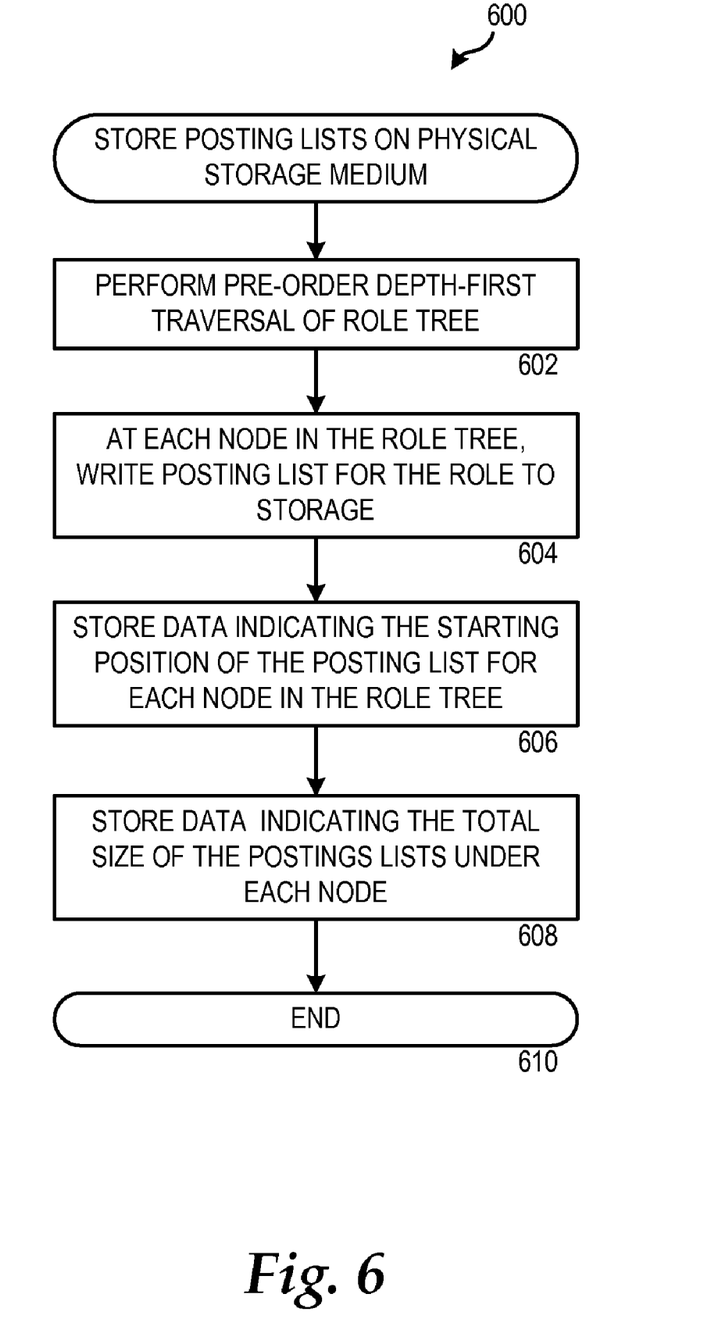
FIGS. 6-7 are flow diagrams showing illustrative routines for storing and retrieving posting lists, respectively, according to various embodiments presented herein.

Referring now to FIG. 6, additional details will be provided regarding the embodiments presented herein for efficiently storing and retrieving the posting lists 306. In particular, FIG. 6 is a flow diagram showing one routine 600 that illustrates aspects of one process presented herein for writing the posting lists 306 to a physical storage medium.

It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 600 begins at operation 602, where a pre-order depth-first traversal of the role tree 400 is performed. At each of the nodes of the role tree 400, the posting list 306 for the corresponding role and current word is written to a physical storage medium. If no posting list exists for the current node, no posting list will be written to physical storage. This occurs at operation 604. From operation 604, the routine 600 proceeds to operation 606.

At operation 606, data is stored indicating the starting position of the posting list at each node in the role tree 400. The routine 600 then continues to operation 608, where data is stored indicating the total size of the posting lists under each node. As mentioned above, this data may be stored in the lexicon 302 or in another location. From operation 608, the routine 600 proceeds to operation 610, where it ends. It should be appreciated that once the routine 600 has completed its execution, the posting lists 306 in a subtree of the hierarchy defined by the role tree 400 can be loaded from the physical storage medium as a single contiguous block.

Figure 7:
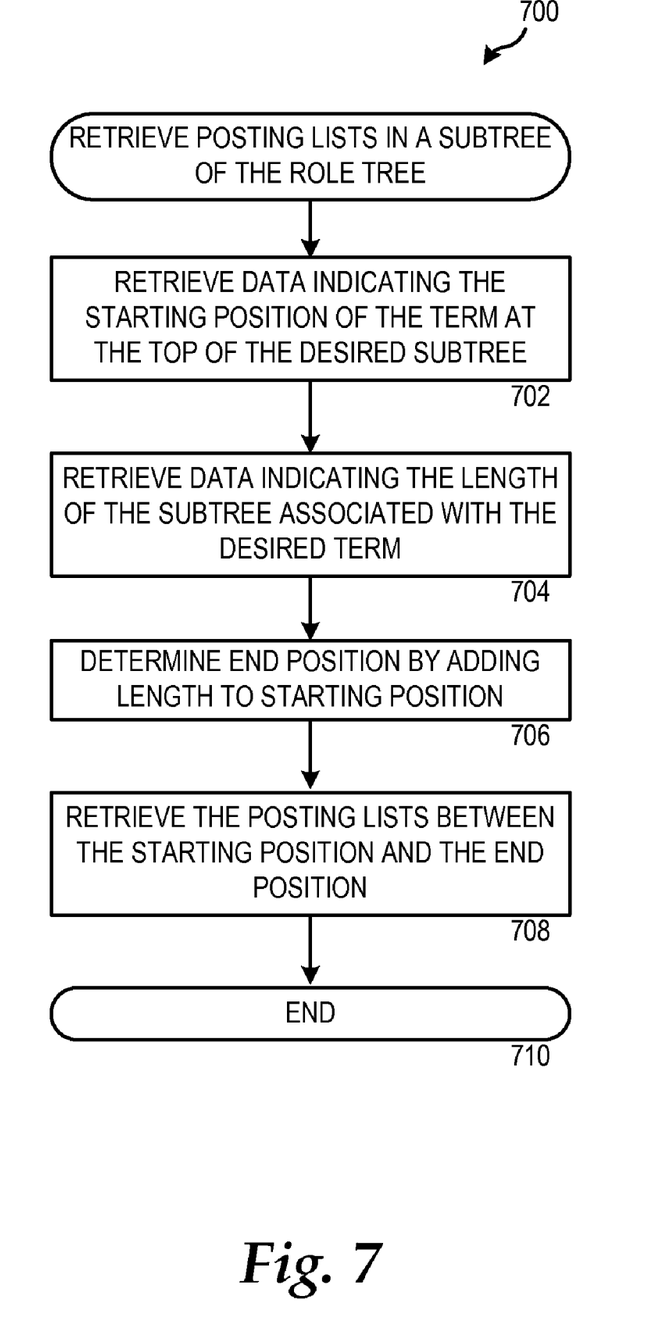

Turning now to FIG. 7, a routine 700 will be described that illustrates aspects of one process presented herein for retrieving data from a physical storage medium that has been stored utilizing the process described above with respect to FIG. 6. The routine 700 begins at operation 702, where the stored data identifying the beginning location on the physical storage medium of the posting lists for the term at the top of the desired subtree of the hierarchy is retrieved. The routine 700 then proceeds to operation 704, where the stored data identifying the length of the posting lists of the desired subtree of the hierarchy is also retrieved. This data is utilized to locate the start of each of the subordinate posting lists.

From operation 704, the routine 700 proceeds to operation 706, where the ending position of the desired posting lists is determined utilizing by adding the length of the posting list to the indicated beginning location on the physical storage medium. Once the length has been determined, the routine 700 proceeds to operation 708, where a single continuous block is retrieved from the physical storage medium beginning at the beginning location of the desired posting lists for the subtree through the computed end of the posting lists. In this manner, the posting lists for the desired subtree can be retrieved using a single read operation. From operation 708, the routine 700 proceeds to operation 710, where it ends.

Figure 8:
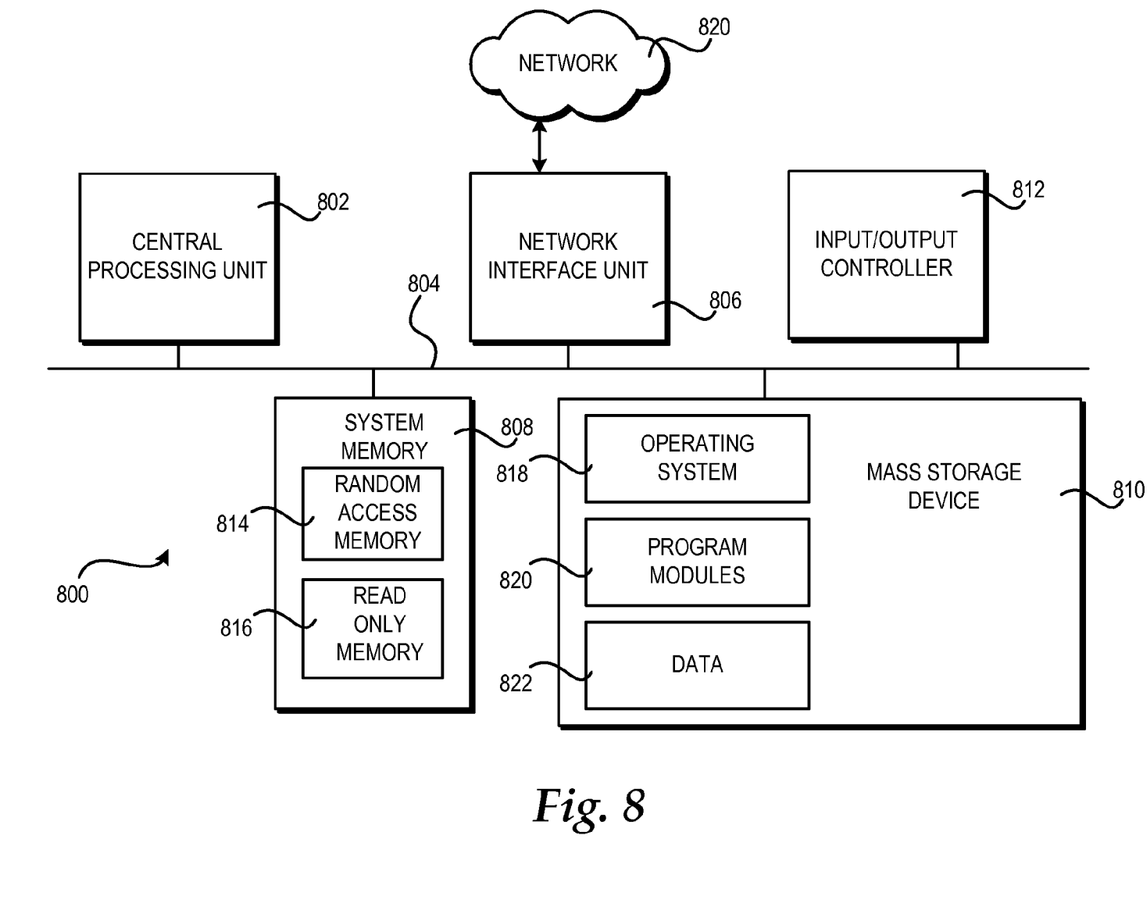
FIG. 8 is a computer architecture diagram showing an illustrative computer hardware and software architecture for a computing system capable of implementing aspects of the embodiments presented herein.

FIG. 8 shows an illustrative computer architecture for a computer 800 capable of executing the software components described herein for efficiently storing and retrieving posting lists. The computer architecture shown in FIG. 8 illustrates a conventional desktop, laptop, or server computer and may be utilized to execute any aspects of the software components presented herein.

The computer architecture shown in FIG. 8 includes a central processing unit 802 ("CPU"), a system memory 808, including a random access memory 814 ("RAM") and a read-only memory ("ROM") 816, and a system bus 804 that couples the memory to the CPU 802. A basic input/output system containing the basic routines that help to transfer information between elements within the computer 800, such as during startup, is stored in the ROM 816. The computer 800 further includes a mass storage device 810 for storing an operating system 818, application programs, and other program modules, which are described in greater detail herein.

The mass storage device 810 is connected to the CPU 802 through a mass storage controller (not shown) connected to the bus 804. The mass storage device 810 and its associated computer-readable media provide non-volatile storage for the computer 800. Although the description of computer-readable media contained herein refers to a mass storage device, such as a hard disk or CD-ROM drive, it should be appreciated by those skilled in the art that computer-readable media can be any available computer storage media that can be accessed by the computer 800.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 800. It should be appreciated that the term physical storage medium as utilized herein is synonymous with the term computer-readable media, defined above.

According to various embodiments, the computer 800 may operate in a networked environment using logical connections to remote computers through a network such as the network 820. The computer 800 may connect to the network 820 through a network interface unit 806 connected to the bus 804. It should be appreciated that the network interface unit 806 may also be utilized to connect to other types of networks and remote computer systems. The computer 800 may also include an input/output controller 812 for receiving and processing input from a number of other devices, including a keyboard, mouse, or electronic stylus (not shown in FIG. 8). Similarly, an input/output controller may provide output to a display screen, a printer, or other type of output device (also not shown in FIG. 8).

As mentioned briefly above, a number of program modules and data files may be stored in the mass storage device 810 and RAM 814 of the computer 800, including an operating system 818 suitable for controlling the operation of a networked desktop, laptop, or server computer. The mass storage device 810 and RAM 814 may also store one or more program modules 820 and data 822, such as those program modules presented herein and described above with respect to FIGS. 1-7. The mass storage device 810 and the RAM 814 may also store other types of program modules and data.

Based on the foregoing, it should be appreciated that technologies for efficiently storing and retrieving posting lists are provided herein. It should also be appreciated that although the concepts and technologies presented herein are described in the context of a natural language search system that utilizes a semantic index 250, these concepts and technologies may be utilized in conjunction with any inverted index wherein it is useful to apply runtime operations to the union of posting lists for multiple terms that are related to each other in a strict dominance relation.

Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A computer-implemented method for storing and retrieving one or more posting lists from a physical storage medium, the method comprising performing computer-implemented operations for:
   storing a hierarchy of semantic roles comprising a role tree having nodes related to one another in a strict dominance hierarchy, each of the nodes in the role tree corresponding to a semantic role and being associated with one or more terms;
   generating a posting list for each association of a term and a semantic role in the hierarchy, each posting list comprising data identifying one or more documents that include the usage of the term in the associated semantic role;
   storing the posting lists contiguously on a physical storage medium by performing a pre-order depth-first traversal of the nodes of the role tree, and at each of the nodes, writing the posting list for a term associated with the semantic role corresponding to the node to the physical storage medium;
   storing data in a lexicon indicating a starting position for the posting list for each association of a term and a semantic role in the hierarchy and data indicating a total size of the posting lists under each node of the role tree;
   retrieving the data from the lexicon identifying the starting position on the physical storage medium for a term at a top of a desired subtree of the hierarchy;
   retrieving the data from the lexicon identifying the total length of posting lists of the desired subtree of the hierarchy; and
   loading a single contiguous block from the starting position on the physical storage medium through the length, the single contiguous block including the posting lists for the desired subtree of the hierarchy.

2. The method of claim 1, wherein a natural language engine configured to process queries in a natural language format utilizes the posting lists in a semantic index.

3. A computer system for storing and retrieving one or more posting lists stored on a physical storage medium, the computer system comprising:
   a processor: and
   a physical storage medium having computer executable instructions stored thereon which, when executed by the computer, cause the computer to
   associate one or more semantic roles defined by hierarchy with a term, the hierarchy comprising a role tree having nodes corresponding to the semantic roles that are related to one another in a strict dominance relation,
   generate a posting list for each association of a term and a semantic role, the posting list comprising data identifying one or more documents that include usage of the term in the associated semantic role,
   store the posting lists contiguously on the physical storage medium by performing a pre-order depth-first traversal of the nodes of the role tree, and at each of the nodes, writing the posting list for a term associated with the semantic role corresponding the node to the physical storage medium,
   store data in a lexicon indicating a starting position on the physical storage medium of the posting list for each association of a term and a semantic role in the hierarchy and data indicating a total length of the posting lists under each node of the role tree,
   retrieve the data from the lexicon that identifies the starting position on the physical storage medium of the posting lists for a term at a top of a desired subtree of a hierarchy,
   retrieve the data from the lexicon that identifies the total length of the posting lists of the desired subtree of the hierarchy, and to load a single contiguous block from the beginning location through the length from the physical storage medium, the single contiguous block including the posting lists for the desired subtree of the hierarchy.

4. A computer storage medium having computer executable instructions stored thereon which, when executed by a computer, cause the computer to:
   associate one or more semantic roles defined by a hierarchy with a term, the hierarchy comprising a role tree having nodes corresponding to the semantic roles that are related to one another in a strict dominance relation;
   generate a posting list for each association of a term and a semantic role, the posting list comprising data identifying one or more documents that include usage of the term in the associated semantic role;
   store the posting lists contiguously on the physical storage medium by performing a pre-order depth-first traversal of the nodes of the role tree, and at each of the nodes, writing the posting list for a term associated with the semantic role corresponding the node to the physical storage medium, whereby the posting lists in a subtree of the hierarchy can be loaded from the physical storage medium as a single contiguous block;
   store data in a lexicon indicating a starting position on the physical storage medium of the posting list for each association of a term and a semantic role in the hierarchy and data indicating a total length of the posting lists under each node of the role tree;
   retrieve the data from the lexicon identifying the starting position on the physical storage medium for a term at a top of a desired subtree of the hierarchy;
   retrieve the data from the lexicon identifying the total length of posting lists of the desired subtree of the hierarchy; and to
   load a single contiguous block from the starting position on the physical storage medium through the length, the single contiguous block including the posting lists for the desired subtree of the hierarchy.

* * * * *